United States Patent
Zhao et al.

(10) Patent No.: US 10,491,498 B2
(45) Date of Patent: Nov. 26, 2019

(54) METHOD AND DEVICE FOR FINGERPRINT BASED STATUS DETECTION IN A DISTRIBUTED PROCESSING SYSTEM

(71) Applicant: EMC IP Holding Company LLC, Hopkinton, MA (US)

(72) Inventors: Junping Frank Zhao, Beijing (CN); Fenghao Zhang, Chongqing (CN); Yu Cao, Beijing (CN); Jun Tao, Shanghai (CN); Ricky Yuxi Sun, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 121 days.

(21) Appl. No.: 15/271,357

(22) Filed: Sep. 21, 2016

(65) Prior Publication Data

US 2017/0093672 A1    Mar. 30, 2017

(30) Foreign Application Priority Data

Sep. 25, 2015   (CN) .......................... 2015 1 0622302

(51) Int. Cl.
*H04L 12/26* (2006.01)
*H04L 29/08* (2006.01)

(52) U.S. Cl.
CPC ...... *H04L 43/0876* (2013.01); *H04L 43/0817* (2013.01); *H04L 43/10* (2013.01)

(58) Field of Classification Search
CPC ..... H04L 12/26; H04L 29/08; H04L 67/1097; H04L 43/10; G06F 19/328; G06F 19/3418; G06F 21/6245; G06F 21/6227

USPC .................... 709/224, 229; 370/311
See application file for complete search history.

(56) References Cited

U.S. PATENT DOCUMENTS

| | | | | |
|---|---|---|---|---|
| 2006/0129847 A1* | 6/2006 | Pitsos | ................... | H04L 9/3236 713/193 |
| 2009/0287837 A1* | 11/2009 | Felsher | ................. | G06F 19/328 709/229 |
| 2010/0317420 A1* | 12/2010 | Hoffberg | ............ | G06Q 30/0207 463/1 |

(Continued)

OTHER PUBLICATIONS

Notification of the First Office Action, CN Application No. 2015106223027, dated Dec. 29, 2018.

(Continued)

*Primary Examiner* — Tesfay Yohannes
(74) *Attorney, Agent, or Firm* — Brian J. Colandreo; Mark H. Whittenberger; Holland & Knight LLP

(57) ABSTRACT

A method, device, and computer program product for fingerprint based status detection in a distributed processing system is provided. The method comprises: generating and sending, at a root node, an initial fingerprint based on the output message ID to be sent; at a middle node, generating and sending an updated fingerprint based on a received input message ID, an output message ID to be sent and a received fingerprint; sending, at the leaf node, a final updated fingerprint to a tracking task point; and obtaining, at the tracking task point, status information based on the final updated fingerprint. As the method does not generate traffic at each node but only generates tracking traffic at leaf nodes, the approach according to the present disclosure reduces tracking overhead significantly while guaranteeing the reliability of data processing.

18 Claims, 8 Drawing Sheets

(56) References Cited

U.S. PATENT DOCUMENTS

| | | | |
|---|---|---|---|
| 2011/0116719 A1* | 5/2011 | Bilobrov | G06K 9/00711 |
| | | | 382/217 |
| 2012/0106423 A1* | 5/2012 | Nylander | H04W 52/0241 |
| | | | 370/311 |
| 2013/0159021 A1* | 6/2013 | Felsher | G06F 19/328 |
| | | | 705/3 |
| 2013/0288668 A1* | 10/2013 | Pragada | H04W 12/06 |
| | | | 455/426.1 |
| 2016/0147987 A1* | 5/2016 | Jang | G06F 21/32 |
| | | | 726/19 |
| 2016/0323243 A1* | 11/2016 | LeVasseur | H04L 63/1416 |
| 2017/0026806 A1* | 1/2017 | Jampani | H04B 17/318 |

OTHER PUBLICATIONS

Notification of Second Office Action issued in CN Application No. 201510622302.7 dated Jul. 17, 2019.

* cited by examiner

METHOD AND DEVICE FOR FINGERPRINT BASED STATUS DETECTION IN A DISTRIBUTED PROCESSING SYSTEM

RELATED APPLICATION

This application claim priority from Chinese Patent Application Number CN201510622302.7, filed on Sep. 25, 2015 at the State Intellectual Property Office, China, titled "METHOD AND DEVICE FOR FINGERPRINT BASED STATUS DETECTION IN A DISTRIBUTED PROCESSING SYSTEM," the contents of which is herein incorporated by reference in its entirety.

FIELD

Embodiments of the present disclosure relate to the distributed data processing field, and more particularly relate to a method and device for fingerprint based status detection in a distributed processing system.

BACKGROUND

Computer systems are constantly improving in terms of speed, reliability, and processing capability. As is known in the art, computer systems which process and store large amounts of data typically include a one or more processors in communication with a shared data storage system in which the data is stored. The data storage system may include one or more storage devices, usually of a fairly robust nature and useful for storage spanning various temporal requirements, e.g., disk drives. The one or more processors perform their respective operations using the storage system. Mass storage systems (MSS) typically include an array of a plurality of disks with on-board intelligent and communications electronics and software for making the data on the disks available.

Companies that sell data storage systems are very concerned with providing customers with an efficient data storage solution that minimizes cost while meeting customer data storage needs. It would be beneficial for such companies to have a way for reducing the complexity of implementing data storage.

SUMMARY

To solve the above problem, a method and device for fingerprint (FP) based status detection in a distributed processing system is provided. The approach according to embodiments of the present disclosure reduces tracking overhead significantly while guaranteeing reliability of data processing. The method does not generate traffic at each node but only generates tracking traffic at leaf nodes.

The first aspect of the present disclosure provides a method for fingerprint based status detection in a distributed processing system, comprising: generating and sending, at a root node, the original fingerprint based on the output message ID to be sent; generating and sending, at a middle node, the updated fingerprint based on a received input message ID, an output message ID to be sent and a received fingerprint; sending, at a leaf node, a final updated fingerprint to a tracking task point; and obtaining, at the tracking task point, status information based on the final updated fingerprint.

According to an example embodiment of the present disclosure, generating and sending, at the root node, the initial fingerprint based on the output message ID to be sent comprises: receiving a RootMsg and generating and sending the initial fingerprint based on the output message ID to be sent. Obtaining, at the tracking task point, status information based on the final updated fingerprint further comprises: determining whether to resend the RootMsg based on the status information.

According to an example embodiment of the present disclosure, the fingerprint represents context information relating to an input message ID and an output message ID at a node.

According to an example embodiment of the present disclosure, the input message ID and the output message ID are message IDs designated by the distributed processing system.

According to an example embodiment of the present disclosure, generating and sending, at the root node, the initial fingerprint based on the output message ID to be sent comprises: generating the initial fingerprint based on an XOR operation on output message IDs; and sending the initial fingerprint along with the output message ID to a downstream node that is directly connected with the root node.

According to an example embodiment of the present disclosure, generating and sending, at the middle node, the updated fingerprint based on the received input message ID, the output message ID to be sent, and the received fingerprint comprises: generating, in a recursive manner, the updated fingerprint based on an XOR operation on the received input message ID, the output message ID to be sent, and the received fingerprint; and sending the updated fingerprint along with the output message ID to a downstream node that is directly connected with the middle node.

According to an example embodiment of the present disclosure, generating and sending, at the middle node, the updated fingerprint based on the received input message ID, the output message ID to be sent, and the received fingerprint comprises: in response to a number of downstream nodes that are directly connected with the middle node being even, sending additionally the updated fingerprint from the middle node to the tracking task point.

According to an example embodiment of the present disclosure, sending, at the leaf node, the finally updated fingerprint to the tracking task point comprises: sending to the tracking task point the received finally updated fingerprint received within a predefined time threshold along with the received input message ID.

According to an example embodiment of the present disclosure, obtaining, at the tracking task point, status information based on the finally updated fingerprint comprises: obtaining the status information based on an XOR operation on the received final fingerprint and the received input message ID.

According to an example embodiment of the present disclosure, in the case of the number of downstream nodes that are directly connected with the middle node being even, the received final fingerprint further comprises the updated fingerprint received from the middle node.

According to an example embodiment of the present disclosure, determining whether to resend the RootMsg based on the status information comprises: in response to status information that indicates a failure being received, resending the RootMsg to the root node and repeat the above method.

The second aspect of the present disclosure provides a device for fingerprint based status detection in a distributed processing system, comprising: an initial fingerprint generating unit configured to generate and send, at a root node, the initial fingerprint based on the output message ID to be sent; a fingerprint updating unit configured to generate and send, at a middle node, the updated fingerprint based on the received input message ID, the output message ID to be sent and the received fingerprint; the final fingerprint sending unit configured to send, at a leaf node, a final updated fingerprint to a tracking task point; and a status determining unit configured to obtain, at the tracking task point, status information based on the finally updated fingerprint.

According to an example embodiment of the present disclosure, the device further comprises: a receiving unit configured to receive, at the root node, RootMsg; and a resending unit configured to determine, at the tracking task point, whether to resend the RootMsg based on the status information.

According to an example embodiment of the present disclosure, the fingerprint represents the context information relating to an input message ID and an output message ID at all nodes.

According to an example embodiment of the present disclosure, the input message ID and the output message ID are message IDs designated by the distributed processing system.

According to an example embodiment of the present disclosure, the initial fingerprint generating unit comprises: a fingerprint initialization unit configured to generate the initial fingerprint based on an XOR operation on output message IDs; and a first sending unit configured to send the initial fingerprint along with the output message ID to a downstream node that is directly connected with the root node.

According to an example embodiment of the present disclosure, the fingerprint updating unit comprises: a fingerprint updating sub-unit configured to generate, in a recursive manner, the updated fingerprint based on an XOR operation on the received input message ID, the output message ID to be sent, and the received fingerprint; and a second send unit configured to send the updated fingerprint along with the output message ID to a downstream node that is directly connected with the middle node.

According to an example embodiment of the present disclosure, the fingerprint updating unit comprises: a third sending unit configured to, in response to the number of the downstream nodes that are directly connected with the middle node being even, sending additionally the updated fingerprint from the middle node to the tracking task point.

According to an example embodiment of the present disclosure, the final fingerprint sending unit is configured to send to the tracking task point the finally updated fingerprint received within a predefined time threshold along with the received input message ID.

According to an example embodiment of the present disclosure, the status determining unit is configured to obtain status information based on an XOR operation on the received final fingerprint and the received input message ID.

According to an example embodiment of the present disclosure, in response to the number of the downstream nodes that are directly connected with the middle node being even, the received final fingerprint further comprises the updated fingerprint received from the middle node.

According to an example embodiment of the present disclosure, the resending unit is configured to resend the RootMsg to the root node, in response to status information that indicates a failure being received.

The third aspect of the present disclosure provides a computer program product for fingerprint based status detection in a distributed processing system, the computer program product being tangibly stored in a non-transient computer-readable medium and comprising a machine-executable instruction, the machine-executable instruction, when executed, causing a machine to perform steps of the method according to the first aspect of the present disclosure.

BRIEF DESCRIPTION OF THE DRAWINGS

Drawings described herein are provided to further explain the present disclosure and constitute a part of the present application. The example embodiments of the disclosure and the explanation thereof are used to explain the present disclosure, rather than to limit the present disclosure improperly.

DETAILED DESCRIPTION OF EMBODIMENTS

Figure 1:
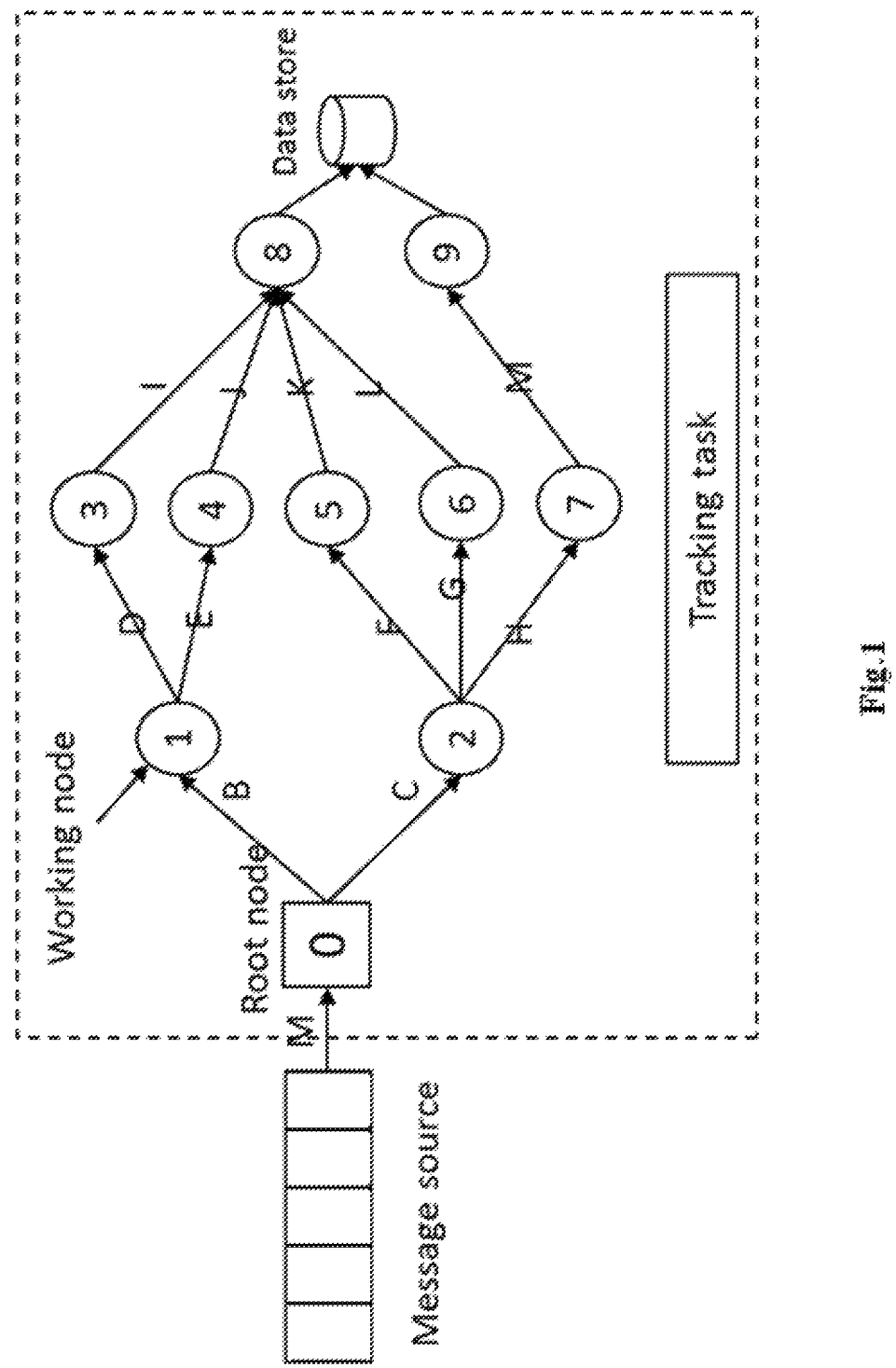
FIG. 1 illustrates the topology of a common distributed processing system.

Reference is made to several example embodiments shown in the drawings to describe principles of the present disclosure. Though preferred embodiments of the present disclosure are illustrated in the drawings, it should be understood that the embodiments are described only to facilitate those skilled in the art in better understanding and thereby achieving the present disclosure, rather than to limit the scope of the disclosure in any manner.

General

Generally, Distributed data processing system, particularly real-time streaming system is becoming hot. Traditionally, Modern real-time streaming systems, such as Pivotal SpringXD, Strom, Spark Streaming, Samza are widely used in e-commence, ETL, big data analysis etc. Typically, it is quite important to provide reliable processing capability so that each data item (or message) is guaranteed to be processed even with any failure in nodes or networking. Conventionally, one of key challenges for such distributed system is how to detect failure in an efficient manner with least cost and performance impact, especially for a large system with thousands of nodes and inter-connections.

FIG. 1 illustrates a topology for a common distributed processing system. Topology of the distributed processing system as shown in FIG. 1 usually runs as a DAG (Directed Acylic Graph). In the topology as shown in FIG. 1, nodes executing particular logics are implemented as processes/threads and deployed in multiple hosts, and edges represent the messages to be processed. Upstream and downstream nodes are with "publish-subscribe" relationship. More nodes could be added for balance or performance scaling and/or processing pipelines. There are two kinds of nodes with different roles: (a) root node and (b) working node. Root node is a task to ingest messages from external sources (such as message queue, log or database etc.). The ingested original message is called Root message (RootMsg). Generally, a topology usually has one root node. Typically, a Root node may or may not have processing logic, and then may split or dispatch RootMsgs to its downstream working nodes. Working node is used to process the input message and usually generate new messages for further processing. Message distribution between nodes is configurable depending on the requirement such as random, shuffle, hash partition, etc. Most commonly, they are in-memory processing and no intermediate data persistency except the leaf nodes, which have no new messages and optionally store the final result in a persistent store, such as Database or HDFS.

Tracking task is a centralized monitoring task that tracks the RootMsg processing status and other system level status like performance.

Regarding reliable data processing, there are two styles:

(a) "exact once": message is processed exactly once which is the ideal case; and (b) "at least once": message is processed and might be processed more than once.

In practice, "at least once" is more practical to implement. Specifically, once failure is detected, the RootMsg is resent to the distributed system and reprocessed. It may be acceptable for some Apps (i.e., idempotency) and may not be acceptable for other Apps, which are suggested to presist the results at leaf nodes and build logic to detect any possible duplication and take action like dropping a duplicated result.

In either way, one of key challenges is how to detect processing failure in a reliable and scalable manner with least cost, especially in a scenario where there might be thousands of nodes (or even more) and the end-end response time is important.

Two existing methods will be presented below:

Method 1 is to report status from each working node for every input message. Then the tracking task point will monitor the status by tracking each emitted message as well as parent-child relationship. If the distributed processing system processes normally, within a given time threshold (or within a given time-out setting), every derived message from the message origin (such as message B, C, . . . M as shown in FIG. 1) shall be processed. Such method is straightforward but inefficient as each input message suffers extra reporting traffic and the tracking task logic is quite complicated in message relationship and status monitoring, thus consuming much memory and CPU.

Method 2 is an enhanced method that is called XOR-based algorithm which greatly reduces complexity and memory usage of the tracking task. Details of the method are presented as follows.

The following formula illustrates the idea of the method:

$$A \text{ xor } A \text{ xor } B \text{ xor } B \text{ xor } C \text{ xor } C \ldots = 0 \quad (1),$$

wherein A, B or C, etc. are message identification (or message ID) "in pair." Each message ideally should be shown in pair, namely, being sent once and received once.

Receiving order does not matter as long as there is no timeout (namely, within the predefined time threshold). When some failure occurs, such as message loss, node crash or time-out, the monitored status must be "non-zero," thereby triggering message resending.

Figure 2:
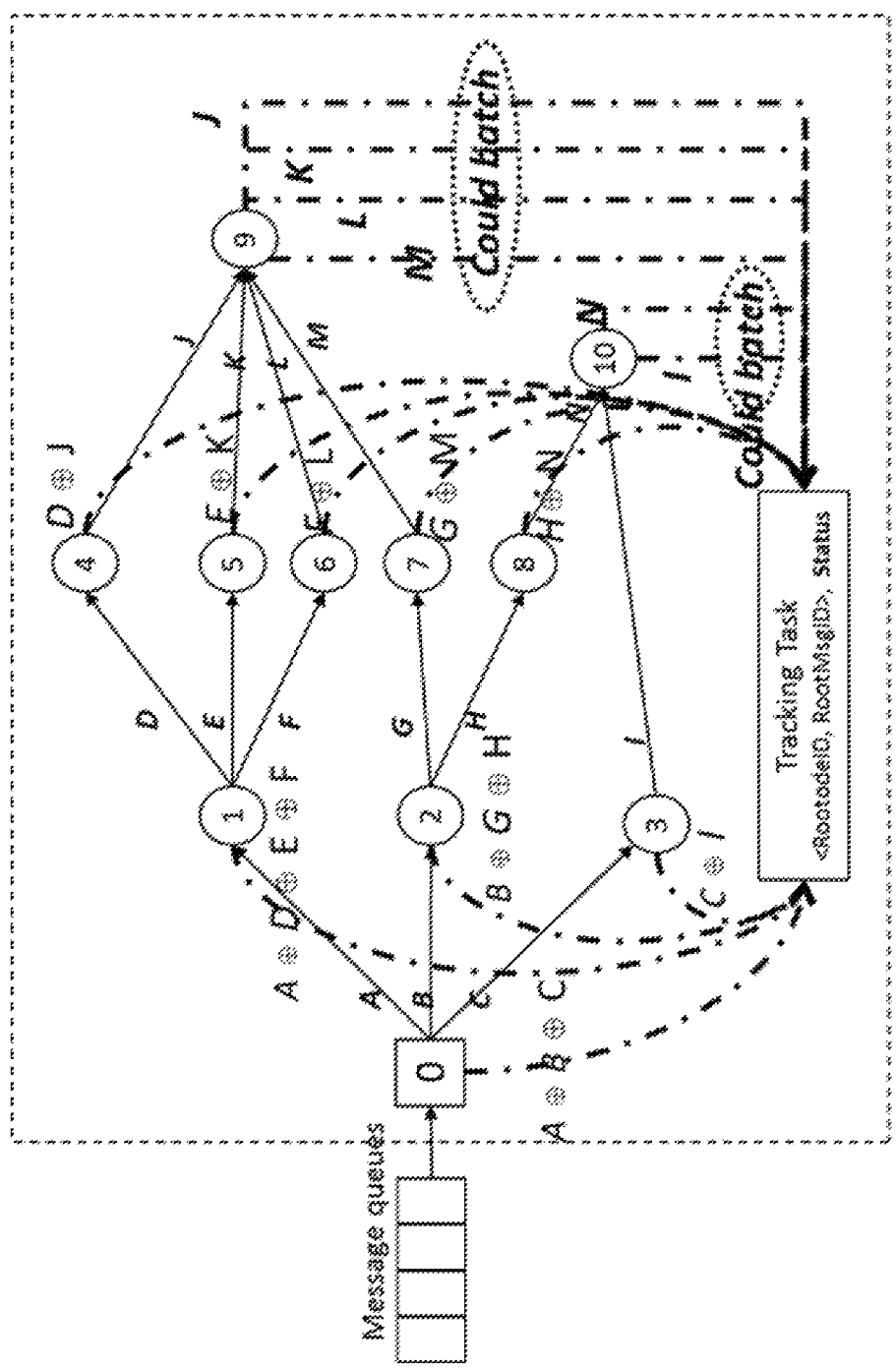
FIG. 2 illustrates an example of XOR-based status detection.

FIG. 2 illustrates a specific example of XOR-algorithm-based status detection, wherein 0, 1, 2, . . . 10 are nodes and A, B, . . . N are message IDs. First, some of its key designs need to be noted:

every node has a unique ID;

every message (RootMsg or derived message) is designated a randomly generated unique ID (for example, 64 bit);

every derived message has metadata embedded in the payload such as RootNodeID, RootMsgID, and MsgID for itself, <RootNodeID, RootMsgID> are used to specify the message origin; and "Status" is a value representing the tracking status.

Further, it can be noted that the processed message can be sent at the working nodes in batch (or in group) for common optimization technologies. As shown in FIG. 2, it is possible to send the message IDs, for example, by aggregating them together as one traffic {j XOR K XOR L XOR M}.

It may also be noted that some reports may fail to be sent due to, for instance, a network outage. Thus, based on the above rules, task tracking would consider it as a failure (or breakdown) and would resend the RootMsg. Nevertheless, by design every message could be processed at least once so that it will never miss any failure case.

The method shown in FIG. 2 illustrates a simple architect design. This method ensures reliability of data processing, however, the tracking overhead due to such reporting at each node still has much room for optimization.

In general, both of above-mentioned methods generate a large amount of extra network traffic. Thus, for every input message, every node shall send a small size (dozen bytes) of tracking traffic over Ethernet, which leads to, on the whole, data packets N times that of the message count, where N is node counts with good batch. Meanwhile, with the increase of the number of nodes and messages, the internal tracking traffic will be increased accordingly, especially for a large topology.

Moreover, in order to send traffic of each report, more extra memory and CPU resource will be consumed. Intensive small packets with more interruption are not friendly for NIC.

In addition, particularly due to memory copy and synchronized/asychronized processing from the applied data processing layer to NIC buffer, each node in the top-down path would generate a bit of latency. With thousands of nodes running in the pipeline, aggregate latency is probably considerable as the end-end latency is in a millisecond (ms) level for a real-time streaming system.

Fingerprint Based Status Detection in a Distributed Processing System

Figure 3:
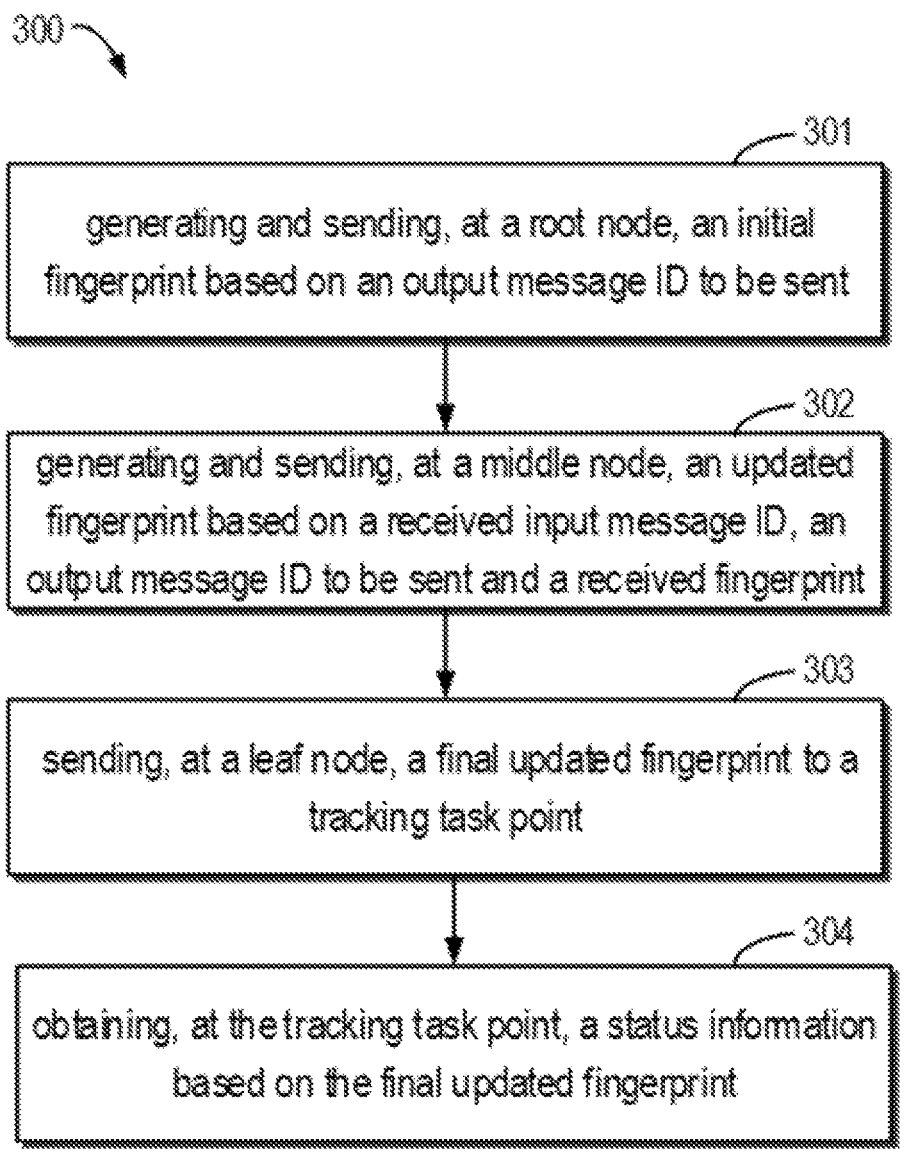
FIG. 3 illustrates a flow diagram of an example of the method for fingerprint based status detection in a distributed processing system according to an embodiment of the present disclosure.

FIG. 3 illustrates a flow diagram of method 300 for fingerprint based status detection in a distributed processing system according to the embodiments of the present disclosure.

As shown in FIG. 3, method 300 comprises steps 301-304. At step 301: generating and sending, at root node, the initial fingerprint based on the output message ID to be sent. Step 301 may further comprise sending a RootMsg ID (R) as an initial status value to the tracking task point, and generating and sending the initial fingerprint based on the RootMsg ID (R) along with the output message IDs to be sent (referring to FIG. 5B).

At step 302: generating and sending, at a middle node, the updated fingerprint based on the received input message ID, the message information ID to be sent and the received fingerprint. At step 303: sending, at a leaf node, the finally updated fingerprint to the tracking task point. At step 304: obtaining, at the tracking task point, the status information based on the finally updated fingerprint.

It should be noted that the fingerprint represents the context information relating to the input message ID and the output message ID at all nodes. It should be further noted that the input message ID and the output message ID may be unique message IDs designated by the distributed processing system. For example, input message ID and the output message ID may be 64 bits generated randomly which can maintain its uniqueness for years in the distributed system.

According to an example embodiment of the present disclosure, step 301 further comprises: receiving RootMsg and generating, and sending the initial fingerprint based on the output message ID to be sent.

According to example embodiments of the present disclosure, step 304 further comprises: determining whether to resend the RootMsg based on the status information.

According to an example embodiment of the present disclosure, at step 301, generating and sending, at the root node, the initial fingerprint based on the output message ID to be sent comprises: generating the initial fingerprint based on an XOR operation on output message IDs; and sending the initial fingerprint along with the output message ID to the downstream node that is directly connected with the root node.

According to an example embodiment of the present disclosure, at step S302, generating and sending, at the middle node, the updated fingerprint based on the received input message ID, the output message ID to be sent, and the received fingerprint comprises: generating, in a recursive manner, the updated fingerprint based on an XOR operation on the received input message ID, the output message ID to be sent, and the received fingerprint; and sending the updated fingerprint along with the output message ID to the downstream node that is directly connected with the middle node.

Figure 4:
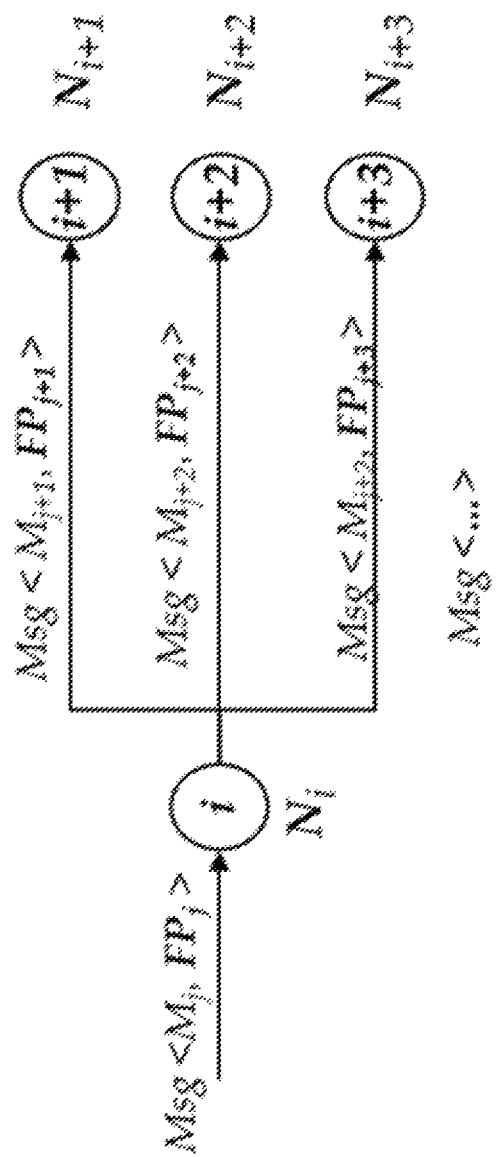
FIG. 4 illustrates a schematic diagram of generating a fingerprint at a node according to an embodiment of the present disclosure.

FIG. 4 shows in details the step 302 of updating fingerprint in the distributed processing system in the above recursive manner. As shown in FIG. 4, under the given working node $N_i$ and the input message $M_j$, the updated (or newly generated) fingerprint $FP_{j+x}$ comprises the following three parts:

(1) the pass-down consolidated fingerprint $FP_j$: to represent parent messaging status;
(2) the input message ID $M_j$: to represent that the input message $M_j$ has been processed;
(3) the newly derived message digest (i.e. an aggregated XOR algorithm of IDs): to represent context of the message ID at the current node. Given a node and an input, new message IDs could be generated in-batch proactively and thus, digest is calculated only at once with the following equation:

$$FP_{j+x} = FP_j \oplus M_j \oplus \{M_{j+1} \oplus M_{j+2} \oplus M_{j+3} \oplus \ldots\} \quad (2)$$

wherein $FP_j$ is the pass-down consolidated fingerprint received by node $N_i$; $M_j$ is the input message ID; $M_{j+1}, M_{j+2}, M_{j+3}$ are IDs of the newly obtained messages and $\{M_{j+1} \oplus M_{j+2} \oplus M_{j+3} \oplus \ldots\}$ are the message digests.

Thus, the fingerprint described with the above equation (2) has the following three important properties:
embedded: as a part of metadata, FP is embedded in the message payload. It's quite compact in memory after arbitrary XOR operations (for example, the memory overhead is always 64 bit);

recursive: parent's FP information is included and inherited into the newly generated message; such "inclusion" is not simply a copy but an append-only update; and append-only update: in the way of append-only update, the context of the message at the current node (represented by an aggregated XOR algorithm of IDs) may be abstracted and appended to the inherited fingerprint along with the message ID. With that, FP information could recursively continue along the nodes layer by layer, and each message is aware of the contexts from the root node via FPs.

It is noted that generating and sending, at the root node, the initial fingerprint based on the output message ID to be sent in step 301 can be considered as a special case of step 302. This is because there is no parent message at the root node. Thus, the parent fingerprint $FP_j$ (i.e. the first part of equation (2)) is 0, thereby the initial fingerprint is only generated based on the output message ID (i.e. $M_{j+1}$, $M_{j+2}$, $M_{j+3}$) to be sent and the RootMsg ID (R).

It is noted that the sending the final updated fingerprint to the tracking task point at the leaf node in 303 can also be considered as a special case of step 302. This is because no newly obtained/derived message will appear at the leaf node. Thus, the third part of equation (2) is 0, thereby there is no updated fingerprint any longer at the leaf node.

Figure 5A:
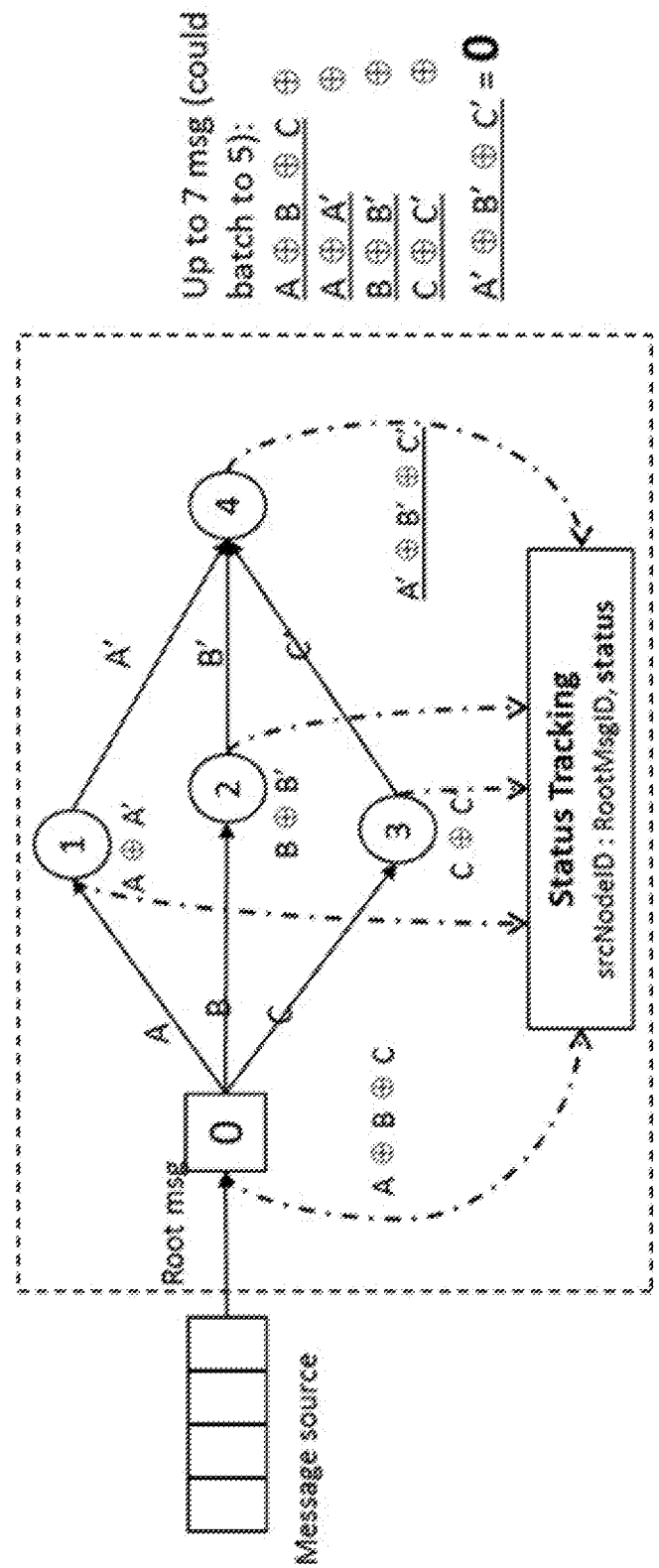
FIG. 5A illustrates an example of XOR-based status detection.
Figure 5B:
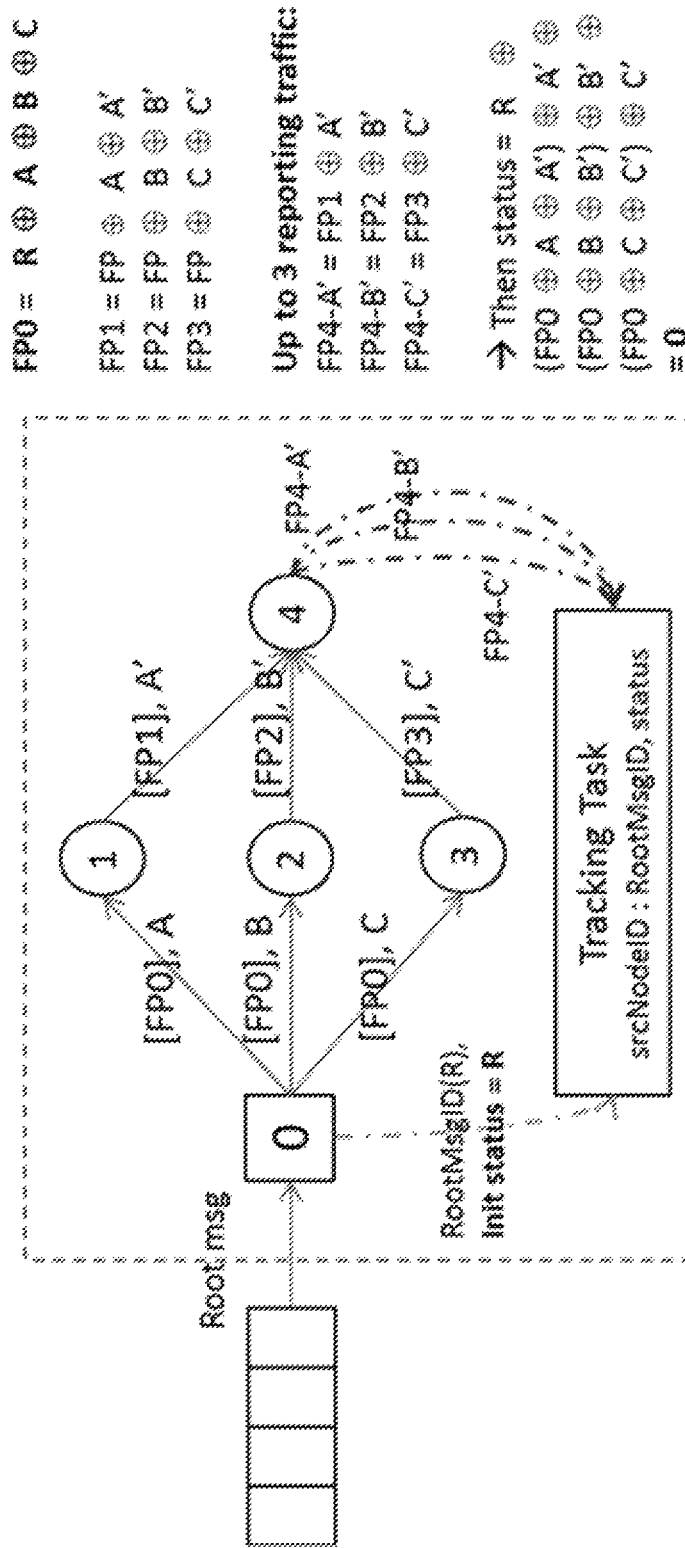
FIG. 5B illustrates an example of fingerprint based status detection according to the embodiments of the present disclosure.

FIG. 5 (including FIG. 5A and FIG. 5B) illustrates a comparison between the XOR-algorithm-based (not fingerprint-based) status detection (FIG. 5A) and the fingerprint-based status detection (FIG. 5B) according to the embodiments of the present disclosure.

In FIG. 5A, A', B', C' and A, B, C are message IDs and the numeral number 0, 1, 2, 3, 4 are nodes, in which 0 is the root node, 4 is the leaf node and 1, 2, 3 are middle nodes. As indicated by the dashed lines in the figure, after the message is processed by each node, each node reports a message to the tracking task node. As shown in FIG. 5A, based on the XOR operation on all the reported messages from all the nodes, the result representing the final status is 0, namely, each message has been sent and received once. However, as reporting message needs to be sent to the task tracking point at each node, it will result in as many as 7 reports (though the number might be reduced to 5 when A', B' and C' are sent at the same time as a batch).

Now referring to FIG. 5B. FIG. 5B illustrates an example for fingerprint-based status detection according to an embodiment of the present disclosure. The topology shown in FIG. 5B is exactly the same as that shown in FIG. 5A, and the same reference numbers used in FIG. 5B refer to the same elements in FIG. 5A.

In FIG. 5B, according to steps 301 and 302, fingerprints can be generated at each node. Specifically, initial fingerprint $FP0 = R \oplus A \oplus B \oplus C$ is generated at root node 0 and updated fingerprint $FP_1$, $FP_2$ and $FP_3$ are generated at working node 1, 2 and 3, respectively. $FP_1$, $FP_2$, and $FP_3$ can be obtained with the above equation (2) in the form of:

$FP_1 = FP0 \oplus A \oplus A'$ $FP_2 = FP0 \oplus B \oplus B'$ $FP_3 = FP0 \oplus C \oplus C'$ Next, the method proceeds to step 303. As shown in FIG. 5B, the final updated fingerprint is sent to the tracking task point only from the leaf node 4. According to an embodiment of the present disclosure, sending, at leaf node 4, the final updated fingerprint to the task tracking point comprises sending the received final updated fingerprints (FP$_1$, FP$_2$ and FP$_3$) along with the received input message ID (A', B' and C') within a predefined time threshold to the tracking task point. As described above, if some reports fail to be received by the tracking task within the predefined time threshold due to, for instance, network outage, the tracking task point would consider it as a failure (or breakdown) and trigger a resending of the RootMsg.

Next, the method proceeds to step 304. At step 304, obtaining, at the tracking task point, status information based on the final updated fingerprints comprises: obtaining the status information based on the XOR algorithm result of the received final fingerprint and the received input message ID.

According to an example embodiment of the present disclosure, and continuing to refer to FIG. 5B, if each node has processed the message successfully, the result representing the final status ("Status") will be 0, based on the fingerprint calculation in equation (2) and according to the steps of the above-described method. The detailed process is shown as below: wherein R is the initial state value sent by the root node.

$$\text{Status} = R \oplus (FP0 \oplus A \oplus A') \oplus A' \oplus$$
$$(FP0 \oplus B \oplus B') \oplus B' \oplus (FP0 \oplus C \oplus C') \oplus C' = 0$$

If the processing of any message at any node fails, the monitored status must be "non-zero". Also referring to FIG. 5B as an example, if the processing of A' fails, only 2 reports from node 4 exist. In this case, the result showing the final status will not be zero. The detailed process is shown as follows:

$$\text{Status} = R \oplus (FP2 \oplus B') \oplus (FP3 \oplus C')$$
$$= R \oplus (FP0 \oplus B \oplus B' \oplus B') \oplus (FP0 \oplus C \oplus C' \oplus C')$$
$$= R \oplus B \oplus C$$
$$\neq 0$$

For another instance, if all the nodes fail (an extreme case), no reports will be sent to the tracking point, and then the final status equals the initial status (R), which is also non-zero ($\neq 0$).

According to an example embodiment of the present disclosure, generating and sending, at the middle node, the updated fingerprint based on the received input message ID, the output message ID to be sent, and the received fingerprint comprises: in response to a number of downstream nodes that are directly connected with the middle node being even, sending additionally the updated fingerprint from the middle node to the tracking task point. Accordingly, in the case of the number of downstream nodes that are directly connected with the middle node being even, the received final fingerprint further comprises the updated fingerprint received from the middle node.

Figure 6:
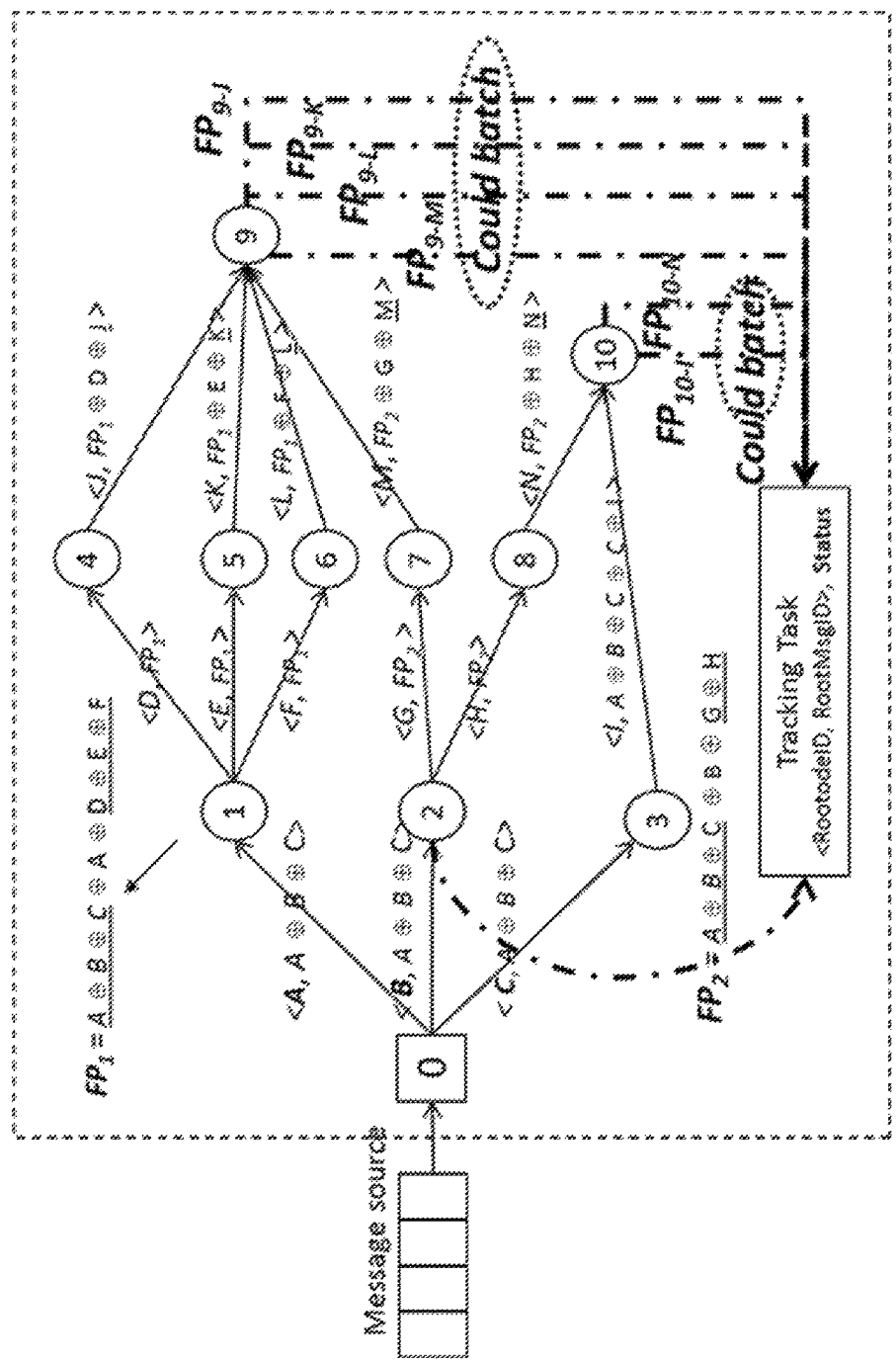
FIG. 6 illustrates a schematic diagram of a further example of the method for fingerprint based status detection in a distributed processing system according to the embodiments of the present disclosure.

FIG. 6 illustrates a schematic diagram of another example of the method for fingerprint based status detection in a distributed processing system according to an embodiment of the present disclosure, wherein the number of the downstream node of the middle node 2 is even (i.e. two nodes: node 7 and node 8). It is noted that the topology shown in FIG. 6 is the same as that shown in FIG. 2.

Under this condition, an additional fingerprint needs to be sent from node 2 as it needs to ensure that a fingerprint is assigned odd times (1, 3, 5, etc.). This way, once all the newly obtained messages are processed successful, they all implicitly comprise a complete fingerprint. Therefore, the number all the fingerprints are even finally. The algorithm is specifically shown as below:

$$FP_{9-J} = FP_1 \oplus D \oplus J \oplus J = FP_1 \oplus D$$

$$FP_{9-K} = FP_1 \oplus E \oplus K \oplus K = FP_1 \oplus E$$

$$FP_{9-L} = FP_1 \oplus F \oplus L \oplus L = FP_1 \oplus F$$

$$FP_{9-M} = FP_2 \oplus G \oplus M \oplus M = FP_2 \oplus G$$

$$FP_{10-N} = FP_2 \oplus H \oplus N \oplus N = FP_2 \oplus H$$

$$FP_{10-I} = FP_3 \oplus I = FP_0 \oplus C$$

$$FP_2 = FP_0 \oplus B \oplus G \oplus H = R \oplus A \oplus C \oplus G \oplus H$$

and the final result of status tracking is:

$$R \oplus FP_{9-J} \oplus FP_{9-K} \oplus FP_{9-L} \oplus FP_{9-M} \oplus FP_{10-N} \oplus FP_{10-I} \oplus FP_2 =$$
$$R \oplus FP_1 \oplus D \oplus E \oplus F \oplus G \oplus H \oplus \{FP_0 \oplus C\} \oplus \{FP_0 \oplus B \oplus G \oplus H\} =$$
$$R \oplus FP_1 \oplus B \oplus C \oplus D \oplus E \oplus F = 0;$$

wherein $FP_1 = (R \oplus A \oplus B \oplus C) \oplus A \oplus D \oplus E \oplus F = R \oplus B \oplus C \oplus D \oplus E \oplus F$.

According to an example embodiment of the present disclosure, determining whether to resend the root message based on the status information comprises: in response to status information that indicates a failure being received, resending the RootMsg to the root node and repeat the above method.

By comparing FIG. 6 and FIG. 2 with the same topology, the traditional checking method requires as many as 15 traffics (if not processed in batch at the leaf node) while the method disclosed herein only requires 7 (as indicated by the dashed line in FIG. 6), thereby reducing the traffic by about 50%. In addition, due to the law of association and commutation of XOR algorithm, the reporting order is not limited in the method disclosed herein, in other words, the reporting messages can be combined in any order.

Figure 7:
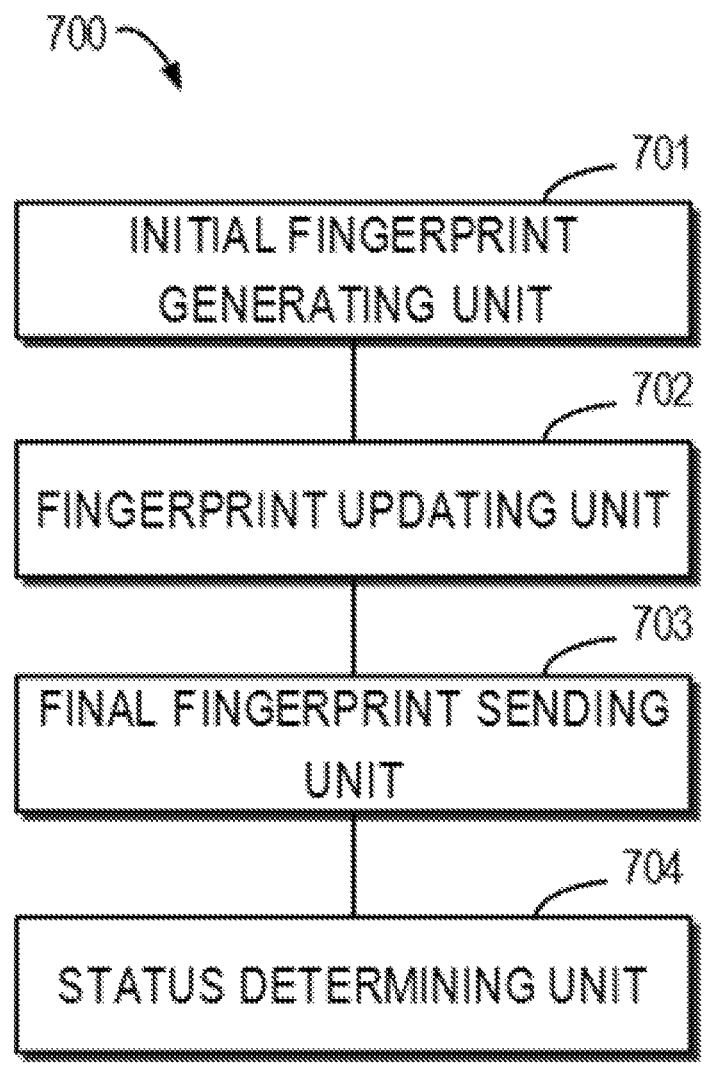
FIG. 7 illustrates a block diagram of the device for fingerprint based status detection in a distributed processing system according to the embodiments of the present disclosure.

FIG. 7 illustrates a block diagram 700 of the device for fingerprint based status detection in a distributed processing system according to the embodiments of the present disclosure. The device comprises: an initial fingerprint generating unit 701 configured to, generate and send, at a root node, initial fingerprint based on the output message ID to be sent; a fingerprint updating unit 702 configured to generate and send, at a middle node, the updated fingerprint based on the received input message ID, the output message ID to be sent and the received fingerprint; a final fingerprint sending unit 703 configured to send, at a leaf node, a final updated fingerprint to a tracking task point; and a status determining unit 704 configured to obtain, at the tracking task point, status information based on the finally updated fingerprint.

According to an example embodiment of the present disclosure, the device 700 further comprises: a receiving unit configured to receive, at the root node, a RootMsg; and a resending unit configured to determine, at the tracking task point, whether to resend the RootMsg based on the status information.

It should be noted that the fingerprint represents the context information relating to the input message ID and the output message ID at all nodes. It should be further noted that the input message ID and the output message ID are message IDs designated by the distributed processing system.

According to an example embodiment of the present disclosure, the initial fingerprint generating unit 701 comprises: a fingerprint initialization unit configured to generate the initial fingerprint based on an XOR operation on output message IDs; and a first sending unit configured to send the initial fingerprint along with the output message ID to a downstream node that is directly connected with the root node.

According to an example embodiment of the present disclosure, the fingerprint updating unit 702 further comprises: a fingerprint updating sub-unit configured to generate, in a recursive manner, the updated fingerprint based on an XOR operation on the received input message ID, the output message ID to be sent, and the received fingerprint; and a second sending unit configured to send the updated fingerprint along with the output message ID to a downstream node that is directly connected with the middle node.

According to an example embodiment of the present disclosure, the fingerprint updating unit 702 further comprises: a third sending unit configured to, in response to the number of the downstream nodes that are directly connected with the middle node being even, sending additionally the updated fingerprint from the middle node to the tracking task point.

According to an example embodiment of the present disclosure, the final fingerprint sending unit 703 is configured to send to the tracking task point the final updated fingerprint received within a predefined time threshold along with the received input message ID.

According to an example embodiment of the present disclosure, the status determining unit 704 is configured to obtain status information based on an XOR operation on the received final fingerprint and the received input message ID.

According to an example embodiment of the present disclosure, in response to the number of the downstream nodes that are directly connected with the middle node being even, the received final fingerprint further comprises the updated fingerprint received from the middle node.

According to an example embodiment of the present disclosure, the resending unit is configured to resend the RootMsg to the root node, in response to status information that indicates a failure being received.

Those skilled in the art should appreciate that steps of the method of the present disclosure may be implemented through universal computing devices, and they may be integrated on a single computing device or distributed on a network formed by a plurality of computing devices. Alternatively, they may be implemented by using program codes that may be executed by the computing device, so that they may be stored in the storage device and executed by the computing device, or they are respectively fabricated as respective integrated circuit modules, or a plurality of modules and steps in them are made be implemented by a single integrated circuit module. As such, the present disclosure is not limited to any specific hardware and software and the combinations thereof.

It should be appreciated that although the above detailed descriptions mention several devices or sub-devices of the apparatus, such division is only example and non-compulsory. In fact, according to embodiments of the present disclosure, features and functions of two or more devices described above may be embodied in one device. Instead, features and functions of one device described above may be further divided and embodied by a plurality of devices.

To conclude, a method and device for fingerprint (FP) based status detection in a distributed processing system in the various embodiments of the present disclosure is provided. As the method does not generate traffic at each node but only generates traffic tracking traffic at leaf nodes, the approach according to the present disclosure reduces tracking overhead significantly while guaranteeing reliability of data processing.

The above are only optional embodiments and not limited to the present disclosure. For those skilled in the art, the present disclosure allows various modifications and changes. Any modifications, equivalent alternatives and improvement, etc. within the spirit and principle of the present disclosure shall be included in the scope of protection of the present disclosure.

What is claimed is:

1. A method for fingerprint-based status detection in a distributed processing system, comprising:
   generating and sending, at a root node, an initial fingerprint based on an output message identification (ID) to be sent;
   generating and sending, at a middle node, an updated fingerprint based on a received input message ID, an output message ID to be sent, and a received fingerprint, wherein generating and sending, at the middle node, the updated fingerprint comprises:
      generating, in a recursive manner, the updated fingerprint based on an XOR operation on the received input message ID, the output message ID to be sent, and the received fingerprint, and
      sending the updated fingerprint along with the output message ID to a downstream node that is directly connected with the middle node;
   sending, at a leaf node, a final updated fingerprint to a tracking task point; and
   obtaining, at the tracking task point, status information based on the final updated fingerprint, wherein obtaining, at the tracking task point, the status information based on the final updated fingerprint comprises:
      determining whether to resend a root message based on the status information.

2. The method according to claim 1, wherein,
   generating and sending, at the root node, the initial fingerprint based on the output message ID to be sent comprises:
   receiving the root message, and
   generating and sending the initial fingerprint based on the output message ID to be sent.

3. The method according to claim 1, wherein the fingerprint represents context information relating to an input message ID and an output message ID at a node.

4. The method according to claim 1, wherein the input message ID and the output message ID are message IDs designated by the distributed processing system.

5. The method according to claim 1, wherein generating and sending, at the root node, the initial fingerprint based on the output message ID to be sent comprises:
   generating the initial fingerprint based on an XOR operation on output message IDs; and
   sending the initial fingerprint along with the output message ID to a downstream node that is directly connected with the root node.

6. The method according to claim 1, wherein generating and sending, at the middle node, the updated fingerprint based on the received input message ID, the output message ID to be sent, and the received fingerprint comprises:

in response to the number of downstream nodes that are directly connected with the middle node being even, sending the updated fingerprint from the middle node to the tracking task point.

7. The method according to claim 1, wherein sending, at the leaf node, the final updated fingerprint to the tracking task point comprises:

sending to the tracking task point the final updated fingerprint received within a predefined time threshold along with the received input message ID.

8. The method according to claim 1, wherein obtaining, at the tracking task point, the status information based on the final updated fingerprint comprises:

obtaining the status information based on an XOR operation on the received final fingerprint and the received input message ID.

9. The method according to claim 8, wherein the received final fingerprint further includes the updated fingerprint received from the middle node in the case of the number of downstream nodes that are directly connected with the middle node being even.

10. The method according to claim 2, wherein determining whether to resend the root message based on the status information comprises:

in response to status information that indicates a failure being received, resending the root message to the root node and repeat the above method.

11. A computing system for fingerprint-based status detection in a distributed processing system, the computing system including a processor and memory configured to perform operations comprising:

generating and sending, at a root node, the initial fingerprint based on an output message identification (ID) to be sent;

generating and sending, at a middle node, an updated fingerprint based on a received input message ID, an output message ID to be sent, and a received fingerprint, wherein generating and sending, at the middle node, the updated fingerprint comprises:

generating, in a recursive manner, the updated fingerprint based on an XOR operation on the received input message ID, the output message ID to be sent, and the received fingerprint, and sending the updated fingerprint along with the output message ID to a downstream node that is directly connected with the middle node;

sending, at a leaf node, a final updated fingerprint to a tracking task point; and obtaining, at the tracking task point, status information based on the final updated fingerprint, wherein obtaining, at the tracking task point, the status information based on the final updated fingerprint comprises:

determining whether to resend a root message based on the status information.

12. The computing system according to claim 11, wherein the computing system is further configured to perform operations comprising:

receiving, at the root node, the root message.

13. The computing system according to claim 11, wherein the fingerprint represents context information relating to an input message ID and an output message ID at a node.

14. The computing system according to claim 11, wherein the input message ID and the output message ID are message IDs designated by the distributed processing system.

15. The computing system according to claim 11, wherein the generating and sending, at the root node, the initial fingerprint based on the output message ID to be sent comprises:

generating the initial fingerprint based on an XOR operation on output message IDs; and sending the initial fingerprint along with the output message ID to a downstream node that is directly connected with the root node.

16. The computing system according to claim 11, wherein the generating and sending, at the middle node, the updated fingerprint based on the received input message ID, the output message ID to be sent, and the received fingerprint comprises:

in response to the number of the downstream nodes that are directly connected with the middle node being even, sending the updated fingerprint from the middle node to the tracking task point.

17. The computing system according to claim 11, wherein sending, at the leaf node, the final updated fingerprint to the tracking task point comprises:

sending to the tracking task point the final updated fingerprint received within a predefined time threshold along with the received input message ID.

18. A computer program product for fingerprint-based status detection in a distributed processing system, the computer program product comprising:

a non-transitory computer readable medium encoded with computer-executable code, wherein the code is configured to enable the execution of:

generating and sending, at a root node, an initial fingerprint based on an output message identification (ID) to be sent;

generating and sending, at a middle node, an updated fingerprint based on a received input message ID, an output message ID to be sent, and a received fingerprint, wherein generating and sending, at the middle node, the updated fingerprint comprises:

generating, in a recursive manner, the updated fingerprint based on an XOR operation on the received input message ID, the output message ID to be sent, and the received fingerprint, and sending the updated fingerprint along with the output message ID to a downstream node that is directly connected with the middle node;

sending, at a leaf node, a final updated fingerprint to a tracking task point; and obtaining, at the tracking task point, status information based on the final updated fingerprint, wherein obtaining, at the tracking task point, the status information based on the final updated fingerprint comprises:

determining whether to resend a root message based on the status information.

* * * * *